(12) United States Patent
Mechaber

(10) Patent No.: US 11,033,010 B2
(45) Date of Patent: Jun. 15, 2021

(54) NET COVER, CASE OR BAG, SUCH AS A FISHING NET COVER, CASE OR BAG AND A KIT INCLUDING A NET AND NET COVER, CASE, OR BAG

(71) Applicant: Gregory Mechaber, New York, NY (US)

(72) Inventor: Gregory Mechaber, New York, NY (US)

( * ) Notice: Subject to any disclaimer, the term of this patent is extended or adjusted under 35 U.S.C. 154(b) by 287 days.

(21) Appl. No.: 16/010,391

(22) Filed: Jun. 15, 2018

(65) Prior Publication Data

US 2018/0360009 A1 Dec. 20, 2018

Related U.S. Application Data

(60) Provisional application No. 62/520,930, filed on Jun. 16, 2017.

(51) Int. Cl.
*B65D 81/26* (2006.01)
*A01K 77/00* (2006.01)

(52) U.S. Cl.
CPC .................................... *A01K 77/00* (2013.01)

(58) Field of Classification Search
CPC ..... A01K 77/00; A01K 97/06; Y10S 224/922; B65D 81/264; B65D 81/266; B65D 81/267; B65D 81/268
USPC .......... 206/315.1, 315.11, 204; 150/154, 163
See application file for complete search history.

(56) References Cited

U.S. PATENT DOCUMENTS

| | | | | |
|---|---|---|---|---|
| 2,818,670 A | * | 1/1958 | Darkenwald | A01K 77/00 43/11 |
| 2,923,450 A | * | 2/1960 | Darkenwald | A01K 77/00 224/610 |
| 4,085,873 A | * | 4/1978 | Schweitzer | A45C 7/0077 224/153 |
| 4,090,543 A | * | 5/1978 | Chyten | A63B 60/58 150/163 |
| 4,139,961 A | * | 2/1979 | Markos | A01K 77/00 43/12 |
| 4,477,993 A | * | 10/1984 | Woermbke | A01K 77/00 43/11 |
| 4,980,988 A | * | 1/1991 | Whitman | A01K 77/00 224/920 |
| 5,157,854 A | * | 10/1992 | Rumsey, Jr. | A01K 77/00 43/12 |
| 6,036,067 A | * | 3/2000 | Alcorn | A01K 77/00 206/315.11 |
| D595,377 S | * | 6/2009 | Fusco | D21/754 |
| 2015/0053582 A1 | * | 2/2015 | Lloyd | B65D 33/01 206/363 |
| 2016/0376084 A1 | * | 12/2016 | Wein | B65D 33/004 206/541 |

\* cited by examiner

*Primary Examiner* — Luan K Bui
(74) *Attorney, Agent, or Firm* — John C. Pokotylo; Pokotylo Patent Services

(57) ABSTRACT

A cover for a framed net having a handle includes a first panel and a second panel. The first and second panels are joined at a least a portion of their peripheries such that an opening is provided. The opening is sized to allow the framed net to be inserted between the first and second panels and to allow the net handle to pass through to the outside of the cover.

2 Claims, 4 Drawing Sheets

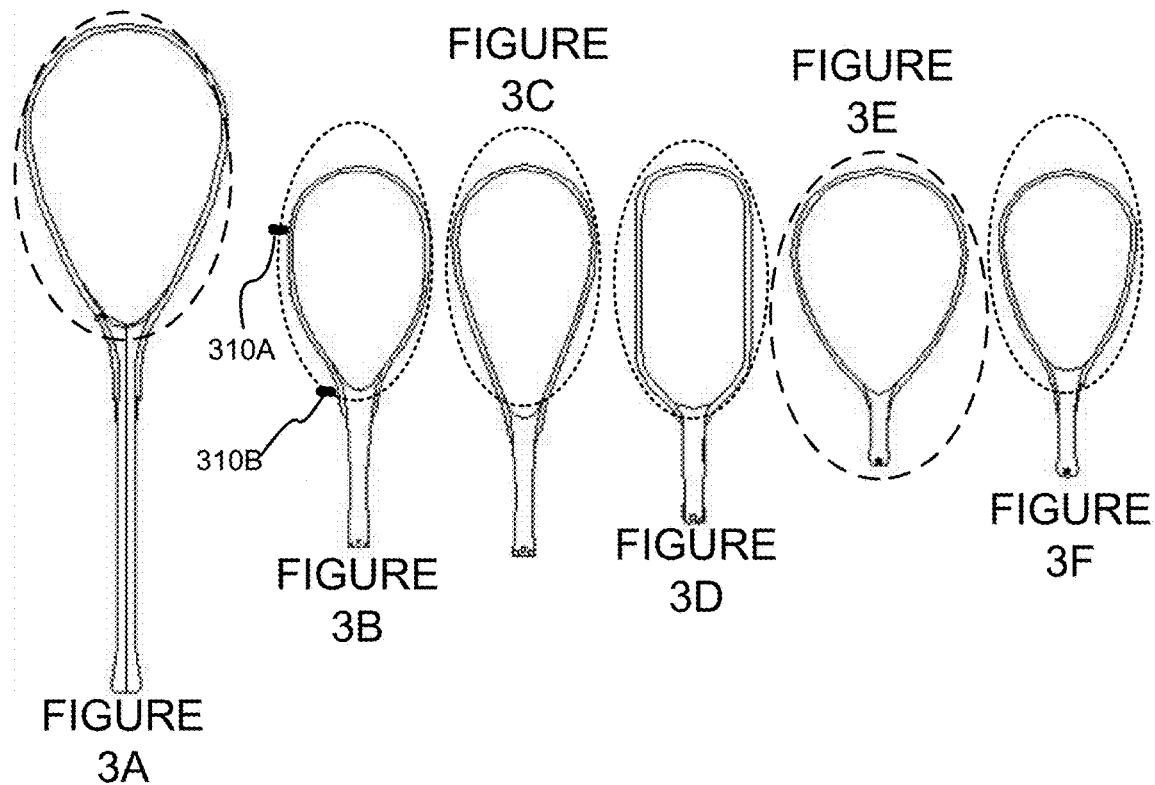
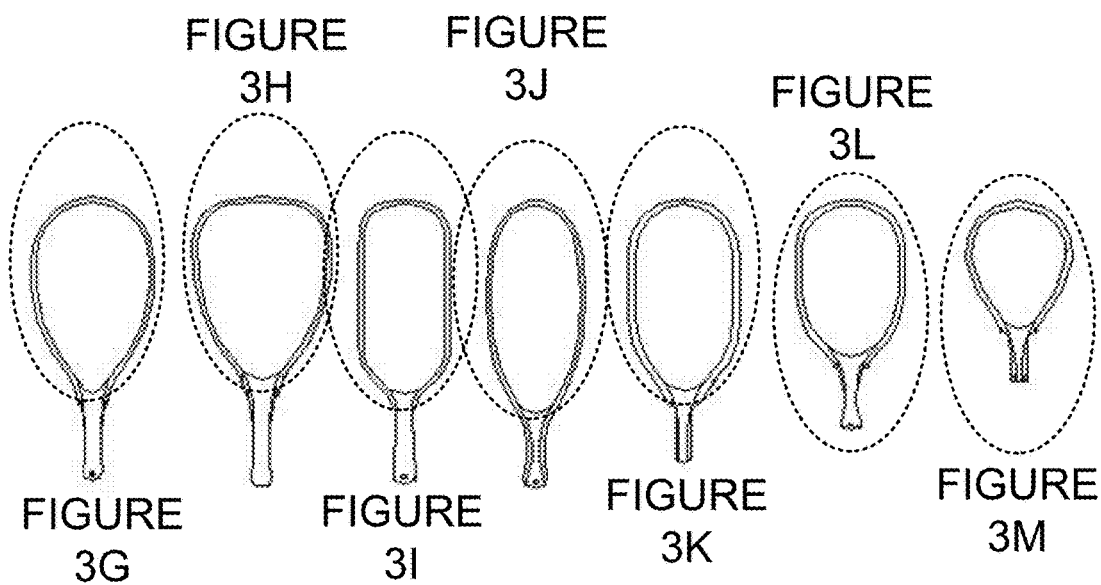

NET COVER, CASE OR BAG, SUCH AS A FISHING NET COVER, CASE OR BAG AND A KIT INCLUDING A NET AND NET COVER, CASE, OR BAG

RELATED APPLICATIONS

The present application claims benefit to the filing date of provisional application Ser. No. 62/520,930 (referred to as "the '930 provisional and incorporated herein by reference), filed on Jun. 16, 2017, titled "NET COVER, CASE OR BAG, SUCH AS A FISHING NET COVER, CASE OR BAG AND A KIT INCLUDING A NET AND NET COVER, CASE, OR BAG," and listing Gregory Mechaber as the inventor.

BACKGROUND OF THE INVENTION

The American Sportfishing Association of Alexandria, Va. reports that in the United States, nearly 46 million licensed anglers generate over $45 billion in retail sales with a $125 billion impact on the nation's economy creating employment for over one million people. They estimate that at least 60 million anglers fish at some point over a five-year period. Despite competition from video games and other similar activities and increased urbanization, recreational angling remains one of the largest outdoor recreational activities in the nation.

Fishing nets are often used to "net" a fish at the side of a boat in order to lift the fish into the boat. Fishing nets come in different shapes and sizes, with different netting, depending on the application in which they are to be used. The common parts include a head, a handle and netting. Examples of fishing net vendors include Cumings of Flint Mich. and Ranger.

The head is a planar or substantially planar, closed shape. Common head shapes include teardrop shaped (See, e.g., FIGS. 1A, 1D, 1G and 1I, squared-teardrop shaped, having one or more straight segments (See, e.g., FIGS. 1C, 1F and 1H.), triangular (See, e.g., FIG. 1B), generally oval or circular, and infinite combinations of such shapes. Note that while most heads are planar, some have a slight (generally upward) bend. (See, e.g., FIG. 1E.) Most heads are convex, but this is not necessary.

A handle may be integrally formed with the head, or may be detachable. Some handles may slide into the head area for more convenient storage. (See, e.g., FIG. 1I.) The head and/or handle are generally made from a strong, lightweight, and rust resistant metal (e.g., aluminum) or plastic, though some nets are made from wood (See, e.g., FIG. 1G) or some other fibrous organic material.

The netting is generally attached to or looped around the head. The netting can be made from various materials such as, for example, woven or braided nylon. The netting is defined by a mesh. The spacing of the mesh depends on the desired characteristics associated with the particular fishing application. For example, compare the relatively closed mesh of FIGS. 1A and 1H with the more open mesh of FIGS. 1B-1G and 1I. The net is generally tapered from its top to its bottom. The taper may be exaggerated as shown in FIG. 1C. The bottom may be relatively planar (See, e.g., FIG. 1A.), linear (See, e.g., FIG. 1H.), come to a point (See, e.g., FIG. 1B.), or free formed (See, e.g., FIGS. 1C-1E, 1G, and 1I.). The size, shape, and taper of the netting depend on the desired characteristics associated with the particular fishing application. However, all these nets have a large, bag shaped net, which has inherent problems.

As should be apparent from FIGS. 1A-1I, the netting generally extends down from the head, and the length of this extension is typically much greater (e.g., at least 5 to 10 times) than the width of the head. One consequence of the mesh and extension of the netting is that it can often become snagged, caught, or tangled on pretty much anything and everything (bolt ends, fishing hooks, part of a fishing pole, etc.) that can project through the mesh. This problem occurs most when the net is in transport to and from the boat in a car or truck, and during storage (e.g., in a closet, attic, basement, or shed, etc.). Untangling or un-snagging the netting is a huge source of frustration on an otherwise pleasant outing. For example, tangled or snagged netting might prevent it from net from being quickly deployed when needed. As another example, tangled or snagged netting might cause another item to move in an unwanted, and potentially dangerous, way. But aside from losing the opportunity to land a trophy fish, or send an entangled item flying, tangled or snagged netting can be just plain frustrating. In addition, pulling on the net when the netting is snagged may tear and/or shorten the life of, or otherwise damage the netting.

In view of the foregoing, it would be useful to store or stow a fishing net in a way that would prevent the netting from becoming snagged, caught, or tangled on something else. Alternatively, or in addition, it would be useful to store or stow a fishing net in a way that eliminates or reduces odors, for example by allowing the netting to dry, or to trap any odors.

SUMMARY OF THE INVENTION

A cover for a framed net having a handle includes a first panel and a second panel. The first and second panels are joined at a least a portion of their peripheries such that an opening is provided. The opening is sized to allow the framed net to be inserted between the first and second panels and to allow the net handle to pass through to the outside of the cover.

BRIEF DESCRIPTION OF THE DRAWINGS

FIGS. 3A-3M illustrate how different sizes and shapes of example covers can accommodate framed nets of a variety of shapes and sizes.

DETAILED DESCRIPTION

In the following, the terms "about" or "approximately" in the context of a dimension means the stated dimension value, plus or minus 10 percent. For example, "about 10 inches" is intended to mean 10 inches, plus or minus 1 inch (or 9-11 inches).

Overview

Figure 1A:
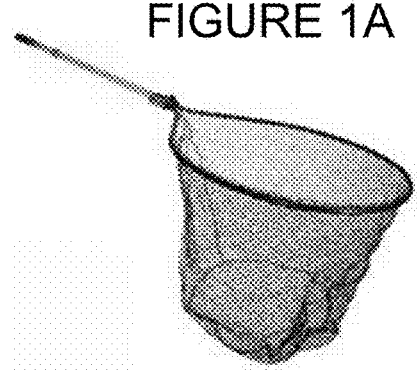
FIGS. 1A-1I illustrate framed nets having handles, which may be covered by a cover consistent with the present description.
Figure 1D:
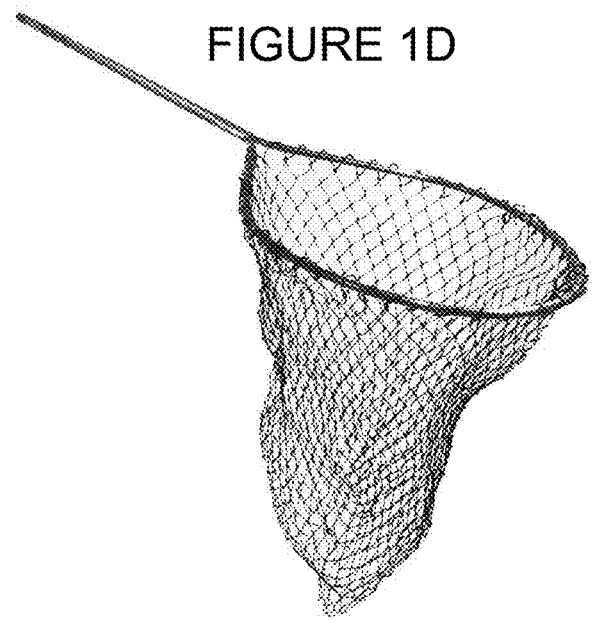
Figure 1B:
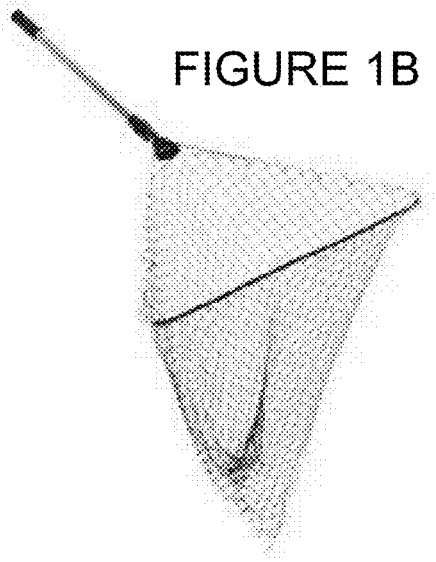
Figure 1E:
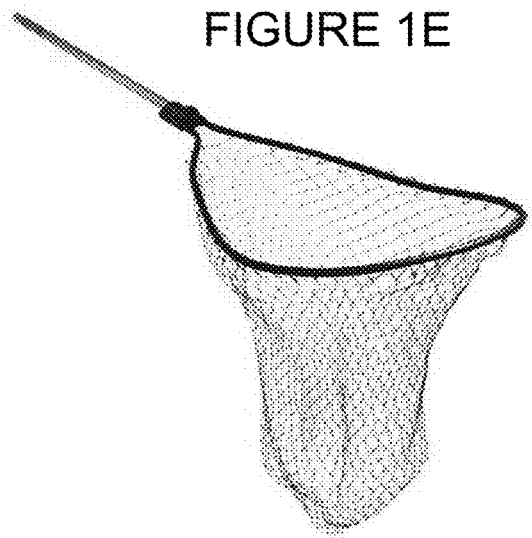
Figure 1C:
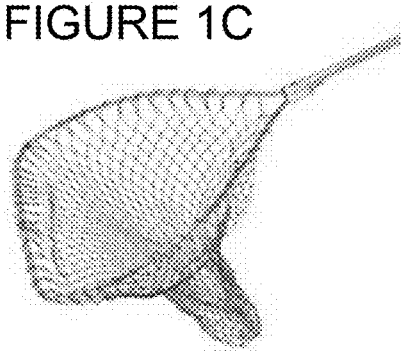
Figure 1F:
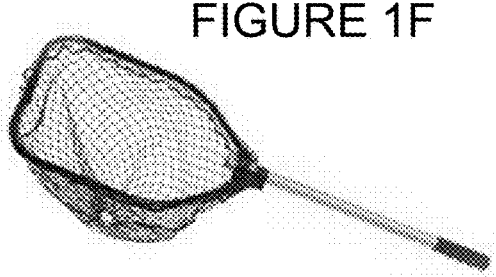
Figure 1G:
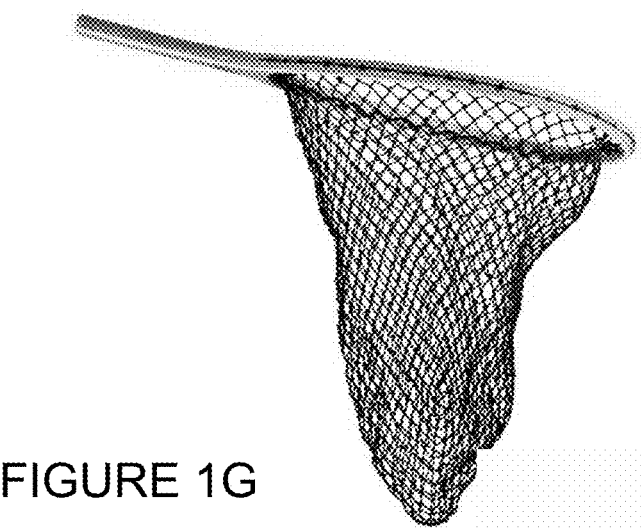
Figure 1H:
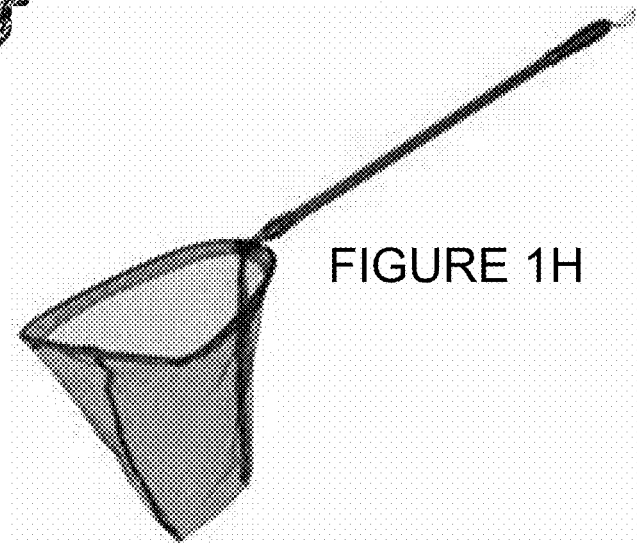
Figure 1I:
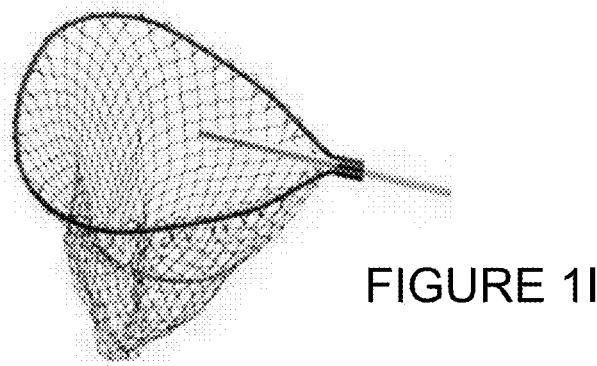
Figure 2:
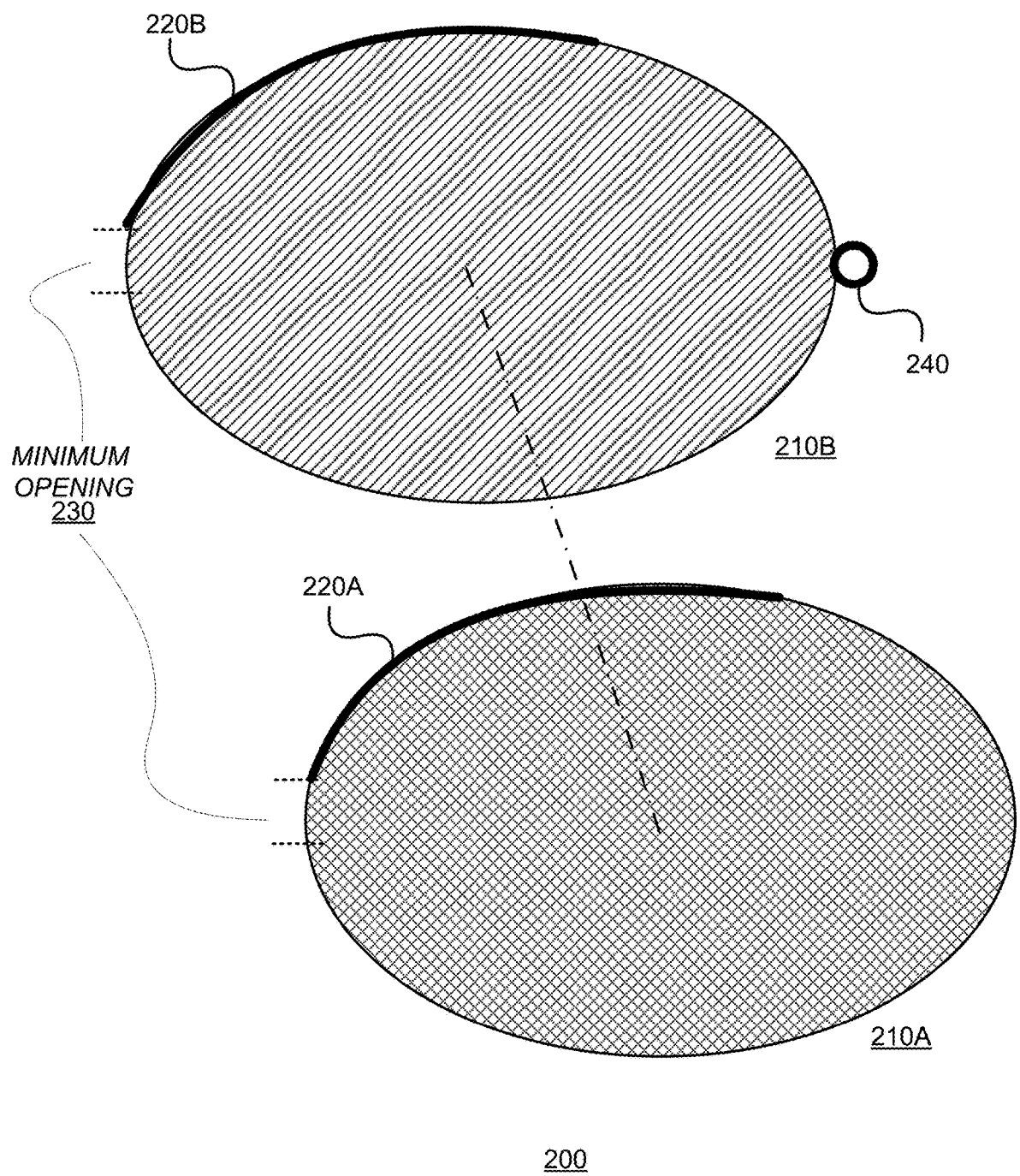
FIG. 2 is an exploded view showing components of an example cover consistent with the present description.

As shown in the exploded view of FIG. 2, an example cover 200 consistent with my invention includes a first panel 210A, and a second panel 210B. The panels are joined together (much like a tennis racket cover) at a least a portion of their peripheries, for example, by stitching, adhesion, piping, etc. In some example embodiments, a minimum opening 230 is provided in order to allow the net handle to pass through to the outside of the cover 200. A mating fastener (e.g., a zipper, hook-and-loop, snaps, buttons, etc.) 220A/220B may be provided on the first and second panels 210a and 210b.

Shapes and Sizes

The panels 210 (and therefore the overall cover, case, or bag) may have different sizes and shapes, but it is expected that most will be generally oval-shaped and/or tear-dropped shaped. Referring to FIGS. 3A-3M, although the cover may be custom sized and shaped to fit a particular net or net head, it may be desired to have a universal or more standardized size and shape used so that more than one type of net or net head can be covered. For example, a single shape and size, depicted in dashed lines, can accommodate the different nets or net heads in FIGS. 3A and 3E. As this example illustrates, the cover may enclose just the head (See, e.g., FIG. 3A.), or the entire net, including its handle (See, e.g., FIG. 3E.). As another example, a single shape and size, depicted in short dashed lines, may be used to cover the different nets or net heads in FIGS. 3B-3D and 3F-3M. As was the case with the earlier example, these covers may enclose just the head (See, e.g., FIGS. 3B-3D and 3F-3K.), or the entire net, including its handle (e.g., in the closed position of a telescoping handles) (See, e.g., FIGS. 3L and 3M.). Table I below provides the sizes of fishing nets in inches.

TABLE I

| Manufacturer | Make | Model | Hoop Size | Shape |
|---|---|---|---|---|
| Bass Pro Shops | Trout Net | 8141/BL | 11 × 15 | tear drop oval |
| Bass Pro Shops | Shadow Tech Net | ST-19-17-36 | 17 × 19 | Tear drop oval |
| Bass Pro Shops | Gold Series Folding | GSF19-24 | 18 × 18 | triangle |
| Bass Pro Shops | XPS Conservation Net | XSP 19-18-30 | 18 × 19 | Oval |
| Bass Pro Shops | Gold Series Fixed Handle | GS 2022 | 20 × 22 | oval |
| Bass Pro Shops | Gold Series Telescoping Handle | GS 2022T | 20 × 22 | oval |
| Bass Pro Shops | Gold Series Telescoping Handle | GS 2022T | 22 × 26 | oval |
| Bass Pro Shops | XPS Conservation Net | XSP 19-18-30 | 22 × 26 | Oval |
| Bass Pro Shops | Gold Series Folding | GSF19-24 | 26 × 25 | triangle |
| Bass Pro Shops | XPS Big Game Net | 65-S-XL-SH | 32 × 36 | tear drop oval |
| Bass Pro Shops | Cat Fish Net | CF29B | 32 × 36 | tear drop oval |
| BLISSWILL | Fly Fishing Net | | 10.2 × 22 | Oval |
| BLISSWILL | Fly Fishing Net | | 11.8 × 17.7 | Oval |
| BlISSWILL | Folding Collapsable net | | 16 × 16 | triangle |
| BlISSWILL | Folding Collapsable net | | 20 × 20 | triangle |
| BLISSWILL | Collapsable | | 22 × 22 × 24 | tear drop square |
| Dot Line | Shad Smelt Shrimp | 2487 | 16 × 16 | tear drop square |
| Dot Line | Shad Smelt Shrimp | 2488 | 16 × 16 | tear drop square |
| Dot Line | Aluminum Hoop and Handle Net | | 18 × 20 | round |
| Dot Line | Trout Net | 2905/B | 8 × 13 | tear drop square |
| Ed Cumings | Fish Saver Landing Net | B-135 | 14 × 11 | tear drop square |
| Ed Cumings | Fish Saver Landing Net | | 14 × 11 | tear drop square |
| Ed Cumings | Black Deluxe Style Boat Net | B-DS-1-SAW | 14 × 18 | tear drop oval |
| Ed Cumings | Black Deluxe Style Boat Net | B-DS-2-SAW | 18 × 22 | tear drop oval |
| Ed Cumings | Night Striker Black Boat Net | NS-R-B-DS-2-S.A.W | 18 × 22 | tear oval |
| Ed Cumings | Salmon and Steelhead | HDW-Wading | 19.25 × 23 | tear bent |
| Ed Cumings | Salmon and Steelhead Bow | 1038 | 19.25 × 23 | tear drop square |
| Ed Cumings | Salmon and Steelhead Bow | 1039 | 19.25 × 23 | tear drop square |
| Ed Cumings | Salmon and Steelhead | CR-HDW | 19.25 × 23 | tear bent |
| Ed Cumings | Salmon and Steelhead Bow | R-HDW | 19.25 × 23 | bent tear |
| Ed Cumings | Long Hurdle Shrimp Net | 198-C-SC-18-P | 20.5 × 21.25 | bent round |
| Ed Cumings | Salmon and Steelhead | HDB-Boat | 21.5 × 25 | bent tear |
| Ed Cumings | Black Deluxe Style Boat Net | B-DS-3-SAW | 21.5 × 26 | tear drop oval |
| Ed Cumings | Salmon and Steelhead Bow | 1040 | 21.5 × 27 | tear square |
| Ed Cumings | Night Striker Walleye Snook | NS-B-1040-4 | 21.5 × 27 | tear oval |
| Ed Cumings | Night Striker Striper | NS-STRIPE-2 | 21.5 × 27 | tear oval |
| Ed Cumings | Salmon and Steelhead | 1044 | 26.5 × 30.5 | tear drop square |
| Ed Cumings | Heavy Duty Salmon CatFish Striper Net | HF-0CT-48-8-2PC | 30.5 × 30.25 | tear drop oval |
| Ed Cumings | Salmon and Steelhead | 1048 | 30.5 × 31.25 | tear drop square |
| Ed Cumings | Night Striker Catfish muskie | NS-BC-1 | 30.5 × 31.25 | tear oval |
| Ego | Kryptek S1 Genesis - medium nylon | 75260 | 17 × 19 | pear |
| Ego | Kryptek S1 Genesis - medium rubber net | 75261 | 17 × 19 | pear |
| Ego | Wade Kryptek - medium nylon net | 75262 | 17 × 19 | pear |
| Ego | Wade Kryptek - medium rubber coated nylon net | 75265 | 17 × 19 | pear |
| Ego | Wade Kryptek - medium rubber net | 75266 | 17 × 19 | pear |
| Ego | Kryptek S1 Genesis - medium clear rubber | 75267 | 17 × 19 | pear |
| Ego | Wade Kryptek - medium clear rubber net | 75268 | 17 × 19 | pear |
| Ego | Kryptek S1 Genesis - medium pvc coated net | 75363 | 17 × 19 | pear |
| Ego | Kryptek S1 Genesis - large nylon net | 75150 | 19 × 21 | pear |

TABLE I-continued

| Manufacturer | Make | Model | Hoop Size | Shape |
|---|---|---|---|---|
| Ego | Kryptek S1 Genesis large rubber net | 75151 | 19 × 21 | pear |
| Ego | Wade Kryptek - large rubber coated nylon net | 75155 | 19 × 21 | pear |
| Ego | Kryptek S1 Genesis - large clear rubber net | 75157 | 19 × 21 | pear |
| Ego | Kryptek S1 Genesis - large deep rubber net | 75351 | 19 × 21 | pear |
| Ego | Kryptek S1 Genesis - large pvc coated net | 75353 | 19 × 21 | pear |
| Ego | Kryptek S1 Genesis - small nylon net | 75370 | 14 × 16 | pear |
| Ego | Reach - rubber net | 71002 | 14 × 18 | Rectangle |
| Ego | S2 Slider | medium | 17 × 19 | pear |
| Ego | S2 Slider | large | 19 × 21 | pear |
| Ego | S2 Slider | large | 22 × 23 | pear |
| Ego | S2 Slider | X-Large | 24 × 27 | pear |
| Ego | Big Game - X Large Nylon Net | 71000 | 24 × 29 | pear |
| Ego | Big Game - X Large Rubber Coated Nylon Net | 71003 | 24 × 29 | pear |
| Ego | Big Game - X Large Rubber Net | 71006 | 24 × 29 | pear |
| Ego | Big Game - XX Large Nylon Net | 71007 | 27 × 33 | pear |
| Ego | Big Game - XX Large Nylon Net | 71009 | 27 × 33 | pear |
| Ego | Big Game - XXX Large Nylon Net | 71008 | 30 × 36 | pear |
| Ego | Reach - pvc coated net | 71001 | | Rectangle |
| FANSYUEROAD | Folding Telescopic | | 50 cm | triangle |
| Fiblink | Folding Aluminum Fishing Landing Net | | 16 × 18 | triangle |
| Fiblink | Folding Aluminum Fishing Landing Net | | 18 × 23 | triangle |
| Fishpond | Nomad Fly Carbon Fiberglass composit mid - net | | 18 × 13 | tear drop oval |
| Fishpond | Nomad Fly Fishing Net | | | tear drop oval |
| Forever Last | Forever Last Net | G2 Pro Net | 15 × 19 | round |
| Frabil | Power Stow Net | 8501 | 14 × 18 | rectangle |
| Frabil | Kwik Stow Foldig Trout Net | 3607 | 18 × 16 | diamond |
| Frabil | Sportsman | 3443 | 20 × 23 | Oval |
| Frabil | Tru Trax Net | 3813 | 20 × 23 | round |
| Frabil | Conservation Flat Bottom | 9510 | 20 × 23 | tear drop oval |
| Frabil | Power Stow Net | 3706 | 20 × 24 | rectangle |
| Frabil | Hiber Net Stowable | 3600 | 22 × 22 × 24 | triangle |
| Frabil | Conservation Flat Bottom | 9501 | 23 × 26 | |
| GOTURE | Fishing Landing Net | | 16 × 19 | triangle |
| GOTURE | Fishing Landing Net | | 20 × 23 | triangle |
| GOTURE | Fishing Landing Net | | 23 × 24 | triangle |
| Lureshine | Collapsible Carbon Fiber Landing Net | | 15.3 × 16 | 2 heads round & Triangle |
| Madbite | Catch and Release | | 16 × 16 | triangle |
| Madbite | Catch and Release | | 20 × 20 | triangle |
| Madbite | Catch and Release | | 24 × 24 | triangle |
| PAMASE | Fish Landing Net | | 14.6 × 16.2 | diamond |
| Plusinno | Collapsible Telescoping Net | | 12 | triangle |
| Plusinno | Collapsible Telescoping Net | | 16 | triangle |
| Ranger | Blue Butterfly | | 12 | oval |
| Ranger | Green Creature, and Bait | | 11 × 9 | square |
| Ranger | Folding Net | FN | 15 × 15 | triangle |
| Ranger | Ruler Telescopic Net | 458RR | 20 × 22 | tear drop oval |
| Ranger | Ruler Telescopic Net | 491RR | 25 × 25 | tear drop oval |
| Ranger | Big Game Series | 980 | | tear |
| Ranger | Red Bait and Shell | | 8 × 6 | square |
| Ranger | Tournament Series | 458 TS | 20 × 20 | tear |
| Ranger | Tournament Series | 9788 FB, 9788 TFB | 25 × 25 | tear |
| Ranger | Tournament Series | 9855 FB, 9855 TFB | 34 × 30 | tear |
| Ranger | Tournament Series | 9800 FB, 9800 TFB | 28 × 30 | tear |
| ranger | Standard Landing net | 325 | 24 × 21 | tear |
| Ranger | Standard Landing net | 332 | 15 × 13 | tear |
| Ranger | Standard Landing net | 334 | 15 × 13 | tear |
| Ranger | Standard Landing net | 335 | 16 × 16 | round |
| Ranger | Standard Landing net | 337 | 20 × 16 | pear |
| Ranger | Standard Landing net | 340 | 17 × 15 | pear |
| Ranger | Standard Landing net | 341 | 16 × 16 | round |
| Ranger | Standard Landing net | 342 | 16 × 16 | round |
| Ranger | Standard Landing net | 343 | 16 × 18 | tear |
| Ranger | Standard Landing net | 344 | 19 × 19 | pear |
| Ranger | Standard Landing net | 349 | 18 × 18 | round |
| Ranger | Standard Landing net | 350, 350T | 22 × 20 | pear |
| Ranger | Standard Landing net | 351H, 351HT | 25 × 25 | pear |
| Ranger | Standard Landing net | 354 | 16 × 16 | round |

TABLE I-continued

| Manufacturer | Make | Model | Hoop Size | Shape |
|---|---|---|---|---|
| Ranger | Standard Landing net | 356 | 19 × 19 | pear |
| Ranger | Standard Landing net | 357 | 21 × 21 | round |
| Ranger | Standard Landing net | 362 | 19 × 19 | pear |
| Ranger | Standard Landing net | 366 | 16 × 16 | round |
| SAIMANQIU | Collapsible Telescoping Net | | | tear drop oval |
| SAMSFX | Aluminu Landing Net - Fly fishing trout | | 12 × 15.5 | tear drop oval |
| SANLIKE | Fish saver Landing Net | | 19 | round |
| SF Fly Fishing Net | Mesh Trout Net Catch and Net | | 9.4 × 15.9 | Square - round - tear |
| VPROZ | Retractable Fishing Net - Telescoping | | 14 | round |
| Wakeman | Classic Landing | 80-FSH5024 | 20 × 19 | round |
| Wakeman | Collapsible & Folding | 80-FSH5024 | 23 × 31 | tear drop oval |

Different implementations of the cover may be provided to cover different ones (or different combinations) of the fishing nets in Table I.

The shape of the cover may be an oval with two axes of symmetry, an oval with one axis of symmetry (e.g., egg or teardrop shaped), or some other shape for accommodating one or more head sizes and shapes.

Opening Locations and Sizes

An opening (which may be closed with a zipper, etc.) between the two panels 210 permits the net or net head to be inserted into the cover or removed from the cover. For example, if the cover is an oval, the opening may extend from one intersection to another, with the perimeter of the oval. (See, e.g., positions 310a and 310b in FIG. 3B.) For example, the opening may be offset to one side (as shown by 220 of FIG. 2). Preferably, the opening should permit the net head (or even the entire net) to be easily inserted into and withdrawn from the cover. Although the opening was described as being closable, this is not necessary. However, closing the opening minimizes the risk of a portion of the netting exiting from the cover.

Note that although the example (exploded view) cover of FIG. 2 is shown as having a minimum opening 230, it is not necessary to have such an opening 230, especially if the entire net, including the net handle, is to be accommodated within the cover 200. (See, e.g., FIGS. 3E, 3L and 3M.)

Materials

The cover panels 210 may be made from a fabric, such as Magnatuff Ultra Nylon available from Top Value Fabrics of Washington state. If a fabric is used, it may be durable to use a hydrophobic material, to prevent the absorption of water. That is, the fabric may be water resistant. It may be desirable to use an antimicrobial and/or anti-mold fabric or material to reduce odors and to reduce or eliminate the growth of undesired organisms. The interior of the panels may be lined with material that is more water resistant, mold resistant, antimicrobial, and/or slippery than the panels (and the panels' exterior). For example, BioCote antimicrobial coating (from BioCote of Coventry, United Kingdom) may be used. As another example, Riviera Marine Fabric (from Herculite of Emigsville, Pa.) may be used.

It may be desired to use orange and/or reflective material for (at least a portion of at least the exterior) of the panels 210. In such an embodiment, the cover (with or without the net) could be used for signaling, such as emergency signaling.

It may be desired to have the cover to remain buoyant (for at least a minimum predetermined period of time) so that it can be retrieved if accidentally dropped into (fresh or salt) water.

Note that if piping is used along the periphery of the cover, this may advantageously allow the cover to maintain its shape, which should make inserting the net or net head easier.

In some embodiments, it may be desirable to produce the panels 210 (or at least their exterior surfaces) from a material suitable for silk screening, dye sublimation, embroidery, heat transfer decals, etc.

Fasteners

A zipper was described for closing at least a part of the opening between the two panels. If a zipper is used, it may be desired to use a corrosion resistant material, such as plastic, nylon, or some other marine grade material. Alternatively or in addition, snaps (metal or plastic), buttons, or hook and loop material (e.g., Velcro) may be used for closing at least a part of the opening.

Improvements

The cover may be provided with a loop (e.g., a fabric loop) 240 to permit the cover, with or without the net, to be hung from a mounting projection such as a peg on the wall of a boat, closet, shed, etc. Although it might be desired to locate the loop 240 opposite the minimum opening 230 as shown in FIG. 2, it may be located elsewhere. Such a loop may also be useful for hanging the cover (with or without a net) at a retail store. This may allow more nets (with covers) to be sold within a given amount of retail space.

The inside surface or one or both panels may be provided with a (e.g., perforated or tight mesh) pocket for holding removable carbon (e.g., in solid form, granular form in a bag, impregnated on a sheet or some other fabric, etc.). If a carbon-impregnated sheet is used, it can be held within the cover in a number of different ways (e.g., clipped, hooked and looped, sandwiched, etc.). Such removable carbon may be used to reduce or eliminate odors.

In some embodiments, the material for the panels may be chosen (and the panels may be appropriately sized) so that a net covered with the cover may be used as an emergency paddle. (See especially FIG. 3A.) Although the panels were described as being made from fabric, one of both of the panels may be made from a more rigid material, such as rigid (e.g., molded) plastic. If one or both of the panels is made from a rigid material, it may be provided with means (for attaching it to an external surface (e.g. marine grade Velcro hook and loop adhesive backed patches).

Kit

Although my invention is mainly directed to the foregoing covers, one embodiment of my invention is a kit including both a fishing net and a cover. The kit may include an attachment system allowing the cover or case to be mounted on a surface (e.g., the gunwale of a boat, center console of a boat, a closet wall, etc.).

Alternatives to Fishing Nets

Although my invention was described in the context of fishing nets, it can be used for covering netting in other contexts (e.g., animal handling, animal rescue, pest control, etc.).

What is claimed is:

1. A cover for a framed net having a handle, the cover comprising:
   a) a first panel;
   b) a second panel; and
   c) removable carbon,
      wherein the first and second panels are joined at at least a portion of their peripheries such that an opening is provided, the opening being sized to allow the framed net to be inserted between the first and second panels and to allow the net handle to pass through to the outside of the cover,
      wherein the first and second panels define an interior region whereby each of the first and second panels has an interior surface and an exterior surface,
      wherein the interior surface of at least one of the first and second panels is provided with a pocket for holding removable carbon, and
      wherein the removable carbon is impregnated on a sheet and is provided in the pocket.

2. A cover for a framed net having a handle, the cover comprising:
   a) a first panel;
   b) a second panel; and
   c) removable carbon,
      wherein the first and second panels are joined at at least a portion of their peripheries such that an opening is provided, the opening being sized to allow the framed net to be inserted between the first and second panels and to allow the net handle to pass through to the outside of the cover,
      wherein the first and second panels define an interior region whereby each of the first and second panels has an interior surface and an exterior surface,
      wherein the interior surface of at least one of the first and second panels is provided with a pocket for holding removable carbon, and
      wherein the removable carbon is provided in at least one of solid form, or granular form in a bag and is provided in the pocket.

\* \* \* \* \*